United States Patent
Porten et al.

(10) Patent No.: US 12,540,441 B2
(45) Date of Patent: Feb. 3, 2026

(54) SWITCH ARRANGEMENT FOR A TRACK-BORNE VEHICLE

(71) Applicant: MAX BOEGL STIFTUNG & CO. KG, Sengenthal (DE)

(72) Inventors: Stefan Porten, Augsburg (DE); Stefan Boegl, Sengenthal (DE); Bert Zamzow, Stockdorf (DE)

(73) Assignee: MAX BOEGL STIFTUNG & CO. KG, Sengenthal (DE)

( * ) Notice: Subject to any disclaimer, the term of this patent is extended or adjusted under 35 U.S.C. 154(b) by 836 days.

(21) Appl. No.: 17/786,757

(22) PCT Filed: Dec. 18, 2020

(86) PCT No.: PCT/EP2020/087091
§ 371 (c)(1),
(2) Date: Jun. 17, 2022

(87) PCT Pub. No.: WO2021/123215
PCT Pub. Date: Jun. 24, 2021

(65) Prior Publication Data
US 2023/0024195 A1    Jan. 26, 2023

(30) Foreign Application Priority Data

Dec. 20, 2019   (DE) ..................... 10 2019 135 569.9

(51) Int. Cl.
*E01B 25/34*     (2006.01)
*E01B 7/08*      (2006.01)
(Continued)

(52) U.S. Cl.
CPC ................ *E01B 25/34* (2013.01); *E01B 7/08* (2013.01); *E01B 25/12* (2013.01); *E01B 25/26* (2013.01);
(Continued)

(58) Field of Classification Search
CPC . E01B 7/08; E01B 25/00; E01B 25/12; E01B 25/26; E01B 25/34; E01B 2202/024; E01B 2202/025
See application file for complete search history.

(56) References Cited

U.S. PATENT DOCUMENTS 3,019,741 A * 2/1962 Bishop ................ B61B 10/025
                                              104/130.09
3,905,568 A * 9/1975 Watanabe ................ E01B 7/08
                                              246/430

(Continued)

FOREIGN PATENT DOCUMENTS

DE        10 25 440 B    3/1958
DE        22 10 963 A    9/1972
(Continued)

OTHER PUBLICATIONS

German Patent Office Search Report, Oct. 23, 2020, 6 pages.
(Continued)

*Primary Examiner* — Cheng Lin
(74) *Attorney, Agent, or Firm* — Dority & Manning, P.A.

(57) ABSTRACT

A switch arrangement for a track-borne vehicle has at least two articulatedly interconnected switch segments mounted so as to be movable with respect to a base surface. At least one switch segment has a drive. At least two switch segments are interconnected by means of an articulation, which has at least two degrees of rotational freedom. The articulation also or alternatively can have at least one degree of translational freedom, which is optionally formed with at least one additional degree of rotational freedom.

19 Claims, 5 Drawing Sheets

Figure 1:
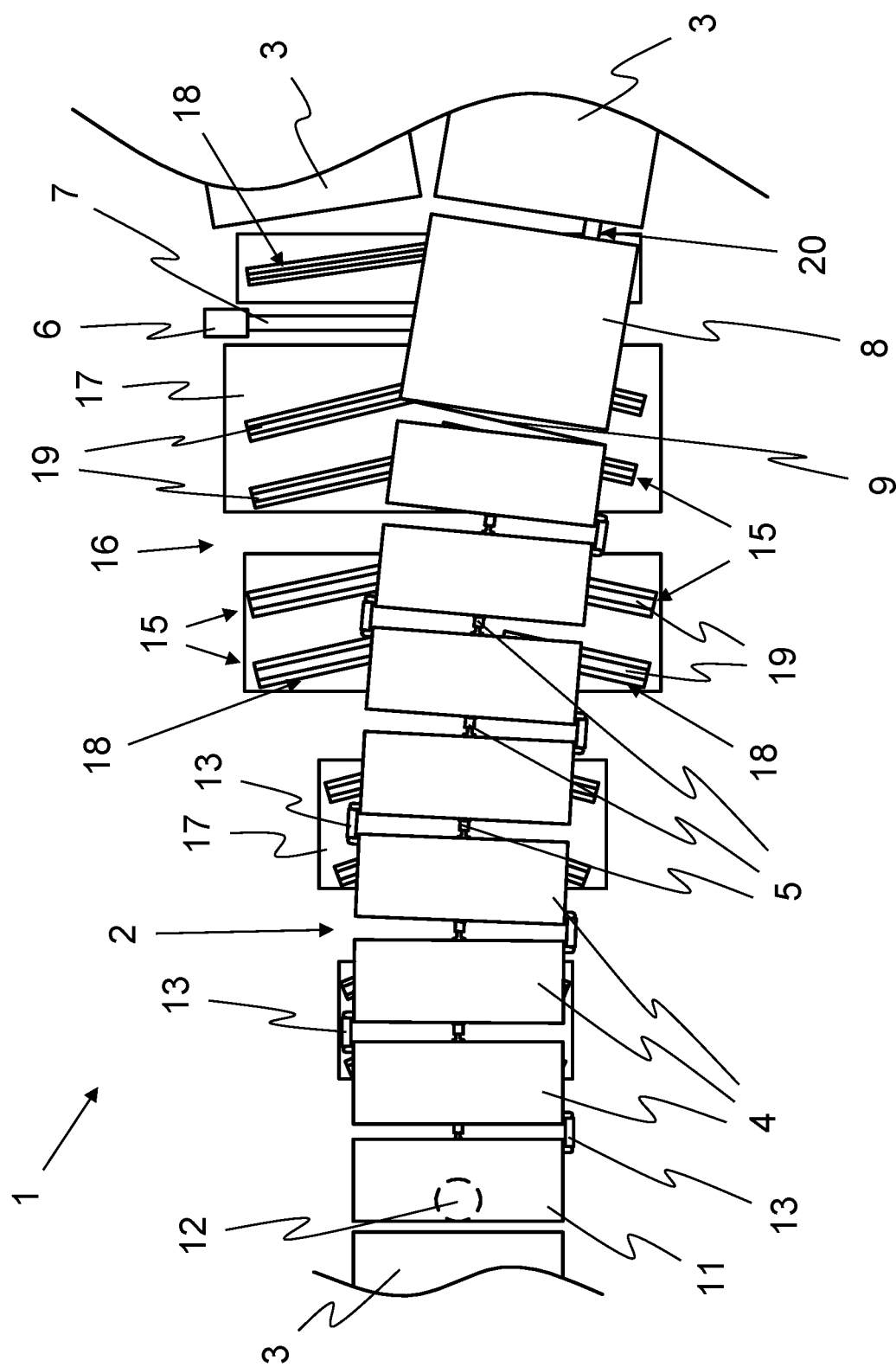

(51) Int. Cl.
    *E01B 25/12*    (2006.01)
    *E01B 25/26*    (2006.01)

(52) U.S. Cl.
    CPC ... *E01B 2202/024* (2013.01); *E01B 2202/025* (2013.01)

(56) References Cited

U.S. PATENT DOCUMENTS

| | | | | |
|---|---|---|---|---|
| 4,016,818 | A * | 4/1977 | Ellzey | E01B 25/26 104/103 |
| 6,279,484 | B1 * | 8/2001 | Shaw | E01B 25/12 104/130.09 |
| 10,788,160 | B2 * | 9/2020 | Elias | F16M 11/2021 |
| 2013/0199404 | A1 * | 8/2013 | Heitzenrater | E01B 7/00 104/130.09 |
| 2018/0230657 | A1 * | 8/2018 | Lay | B61L 5/02 |

FOREIGN PATENT DOCUMENTS

| | | | |
|---|---|---|---|
| DE | 22 47 551 | A | 4/1974 |
| DE | 22 47 729 | A | 4/1974 |
| DE | 23 05 289 | A | 8/1974 |
| DE | 198 00 908 | C1 | 9/1999 |
| DE | 299 17 312 | | 2/2001 |
| FR | 1220188 | A * | 5/1960 |
| JP | 2005036440 | | 2/2005 |
| JP | 2006249787 | | 9/2006 |

OTHER PUBLICATIONS

PCT Search Report, Mar. 19, 2021, 14 pages.
Japanese Office Action for corresponding JP Application No. JP2022-537805, mailed Nov. 6, 2024. 6 pages.

* cited by examiner

SWITCH ARRANGEMENT FOR A TRACK-BORNE VEHICLE

CROSS REFERENCE TO RELATED APPLICATIONS

The present application claims priority to application Serial No. PCT/EP2020/087091 filed on Dec. 18, 2020, which is hereby incorporated herein in its entirety by this reference for all purposes.

FIELD OF THE INVENTION

The present invention relates to a switch arrangement for a track-borne vehicle, having at least two articulatedly interconnected switch segments mounted so as to be movable with respect to a base surface, wherein at least one switch segment has a drive.

BACKGROUND OF THE INVENTION

Track-borne and, in particular rail-borne, mobility is nearly inconceivable without rails. Over time, a plurality of various switch concepts has arisen, with particular advantages and disadvantages. One aspect common to all is that track-borne vehicles can be guided by the switch from at least one guideway selectively onto one of at least two further guideways. Each guideway defines a particular path that is followed by the vehicles riding on the tracks.

Particular challenges for switches result in the case of levitation vehicles, since a guideway for levitation vehicles generally has a particular shape and the levitation vehicle must be held in levitation, of course, also when passing through the switch. The safety of the vehicle must be guaranteed during travel through the switch also in the event of a failure of the levitation.

It has been shown that it is advantageous, in particular in the case of switch arrangements for levitation vehicles, to form the switch arrangement from multiple segments. DE 2 247 551 A1, which corresponds to U.S. Pat. No. 3,905,302, which is hereby incorporated herein in its entirety by this reference for all purposes, describes, for example, a switch arrangement having multiple articulatedly interconnected switch segments mounted so as to be movable with respect to a base surface, wherein a switch position of the switch arrangement can be affected by means of drives arranged at each switch segment.

A disadvantage here is the limited flexibility of the switch arrangement, which manifests itself, for example, in that the switch arrangement can be moved in only one direction, or that comparatively large gaps form between the switch segments in the curved position, which are problematic for the levitation or cause impacts during the passage.

The problem addressed by the present invention is therefore that of refining the switch arrangement from the related art such that the aforementioned disadvantages are overcome.

OBJECTS AND SUMMARY OF THE INVENTION

The problem is solved by a switch arrangement having the features described below along with the drawings.

For the switch arrangement according to the invention for a track-borne vehicle having at least two articulatedly interconnected switch segments mounted so as to be movable with respect to a base surface, wherein at least one switch segment has a drive, it is provided that at least two switch segments are interconnected by means of an articulation, which has at least two degrees of rotational freedom and/or at least one degree of translational freedom, which is optionally formed with at least one additional degree of rotational freedom.

The possible combinations of the degrees of freedom of movement of the articulation make it possible, for example, to move the switch arrangement in various directions. As described further below, an X-shaped switch in addition to a Y-shaped switch, for example, is possible as a result. Moreover, torsional moments, which possibly act upon the switch arrangement, can be at least partially avoided with an articulation having the appropriate degree of freedom. Asymmetric weight loadings during a passage of a vehicle can also be compensated for by the articulation.

One degree of translational freedom enables the switch arrangement to become extended or compressed. On the one hand, a gap width between the switch segments can be adjusted in every position. On the other hand, it is therefore possible to design the switch arrangement to be more compact, since the switch arrangement does not necessarily need to follow a circular arc during the movement.

In addition to the degree of rotational freedom from the related art, in which the rotation axis extends perpendicularly to a guideway plane and perpendicularly to the base surface, further degrees of rotational freedom having rotation axes in parallel to the guideway plane and in parallel to the base surface are conceivable.

One rotation axis can extend, for example, in parallel to the guideway plane and in parallel to the base surface and, simultaneously, essentially in parallel to a direction of travel of the vehicle. This degree of freedom can prevent a transmission of the above-described torsional moments between the switch segments of the switch arrangement.

One rotation axis can extend, for example, in parallel to the guideway plane and in parallel to the base surface and, simultaneously, essentially in parallel to the direction of travel of the vehicle. This degree of freedom can compensate for the above-described asymmetric load weighting during the passage of the vehicle.

The switch segments are made, for example, of steel and/or concrete. These can be shaped similarly to stationary guideways ahead of and behind the switch arrangement. For example, the switch segments can be essentially U-shaped, in particular with an overhanging section, on the underside of which a reaction rail of a levitation system can be arranged. The individual switch segments can all have the same length. It is also conceivable, however, that individual switch segments are longer or shorter. In particular, one end segment of a switch arm can be designed to be longer than the remaining segments.

One single longer segment can be formed, for example, from multiple fixedly interconnected segments. The articulation is preferably arranged in the center on at least one end face of each of the switch segments.

As described above, the vehicle is, for example, a magnetic levitation train and, in particular, a magnetic levitation train that operates according to the short-stator principle. In this case, the active elements of the levitation system and of the drive of the vehicle are arranged, for example, exclusively in the vehicle. The guideway and, in particular, the switch arrangement have, in particular, a current-carrying rail for transmitting energy into the vehicle.

The base surface of the switch arrangement can be formed by one or multiple concrete slab(s). Underneath this, for example, a concrete slab or one or multiple steel girder(s)

can be arranged. If the switch arrangement is an integral part of an elevated railway, the base surface is arranged, for example, on pillars or supports.

The drive is preferably designed as an electric motor with an appropriate force transmission device. In particular, the switch arrangement has precisely one drive for each movable switch arm. The drive is connected, in particular, to the end segment of the switch arm. It is also conceivable, however, that multiple drives are present. The force transmission device can be, for example, a threaded spindle. The drive can be rotatably mounted in order to enable a movement of the driven segment along a curved path. In the case of an emergency, for example, during a power failure, it is advantageous when the drive can be additionally manually adjusted.

The switch arrangement can have, in particular, a movable switch arm. In this way, a Y-switch can be implemented, which guides the vehicle from a fixed guideway selectively onto one of two further fixed guideways. Moreover, the switch arrangement can have four movable switch arms. In this way, an X-switch can be implemented, which enables vehicles to undergo a two-way track change on both sides from two parallel fixed guideways having a very small track center distance without the need to widen the track center distance in the switch area. This enables high passage speeds in the narrow parallel guideway. It is also advantageous when the articulation is designed as a ball-and-socket joint or an adjustable ball joint. A ball-and-socket joint permits movements about three independent axes. The advantages of the above-described possible degrees of rotational freedom can be implemented simultaneously with the ball-and-socket joint. An adjustable ball joint permits a translatory motion in addition to the rotations about the three independent axes. The adjustable ball joint therefore has three degrees of rotational freedom and one degree of translational freedom. The switch arrangement can therefore be extended or compressed.

It is also advantageous when at least one switch segment, in particular an initial segment, is mounted on a pivot bearing. The initial segment refers to the first segment of the switch arrangement as viewed from an incoming vehicle. Only a slight displacement of the initial segment is necessary in order to adjust the switch arrangement according to the invention. The rotation about an axis of the pivot bearing is sufficient here.

It is particularly advantageous when at least one switch segment, in particular an end segment, is connected to the preceding switch segment by means of an articulated rod. The end segment refers to the last segment of the switch arrangement as viewed from the incoming vehicle or the particular last segment of one of multiple switch arms. In the latter case, the end segments are those segments which connect one switch arm to another switch arm. As described above, the end segment can have a length that differs from that of the other switch segments. Different preconditions can also exist for the mounting and guidance of the end segment in comparison to the other segments. In particular, the articulated rod is utilized for transmitting the drive force from the end segment to the remaining switch segments.

It is also advantageous when at least one spring element interconnects two switch segments in each case. A push or pull of the spring element can ensure a defined guidance of the switch segments. For this purpose, the spring element is designed, for example, such that a permanent pressure is applied by a guide member onto a guide element (see below).

The spring element can include, for example, a spring, a pneumatic cylinder, or an elastomeric pad. The spring element can be designed as a tension spring element or compression spring element. In particular, the spring element can be arranged laterally on the switch segments. In addition, two spring elements situated in succession can be arranged on each of the opposite sides of the switch segments. It is also conceivable that two switch segments are connected by two spring elements in each case.

It is particularly advantageous when each switch segment is mounted on at least three support points. Three support points permit a stable mounting of a flat object. Preferably, at least two of the support points are arranged on an underside of the switch segment. In particular, the end segment is mounted on four support points.

It is particularly preferred when one of the support points is formed by the articulation between the switch segments. As a result, one additional support point can be saved and, thereby, material and labor costs for the switch arrangement can be reduced. Consequently, the articulation is designed for transmitting not only actuating forces of the switch arrangement, but also a weight force between two switch segments.

It is advantageous when the support points are displaceable essentially in parallel to the base surface. In this way, in particular, an actuation process of the switch arrangement becomes possible.

For example, at least one sliding surface, on which the support points are movable, is arranged between the base surface and the switch segments.

It is also advantageous when at least one of the support points has at least one degree of rotational freedom. This is advantageous, on the one hand, with respect to the aforementioned pivot bearing, in particular, of the initial segment. On the other hand, it is conceivable that a guide member (see below) is integrated into the support point. A rotation of the support point may be necessary during an interaction of the guide member with a guide element extending in a winding manner.

It is also advantageous when at least one of the support points has at least one roller and/or one slide bearing and/or one fluid bearing.

The roller offers low friction during the movement of the switch arrangement, although the roller must simultaneously withstand high loads and, therefore, be designed to be solid. The roller may have one or multiple guide flank(s) similarly to a wheel of a rail vehicle and, as a result, additionally guide the switch segment during the movement, provided this interacts with an appropriate rail.

A slide bearing can represent a more cost-effective alternative having poorer frictional properties. The slide bearing can be made, for example, of a metal and, in particular, of bronze containing graphite. Since the slide bearing potentially incurs a great deal of wear, it is preferably exchangeable.

A fluid bearing refers to a bearing, in the case of which the switch segment slides on a constantly resupplied fluid film. The fluid film can be, for example, an air cushion. The fluid bearing has the comparatively best frictional properties but is technically the most complicated to implement and requires a constant supply of energy during operation. The fluid bearing has the additional advantage that, when the energy supply is shut off, the switch arrangement is locked up due to the greatly increased friction.

It is also extremely advantageous when one support point has at least one redundant support. In the case of damage or any other type of failure of the support point, the redundant support can prevent the switch segment from dropping. The redundant support can be designed essentially similarly to the support point. In order to avoid friction, it is advantageous, however, when the redundant support is designed to be slightly shorter and, thereby, does not touch the sliding surface during normal operation.

It is also advantageous when at least one guide unit is preferably assigned to each switch segment and includes at least one guided guide member, in particular a guide roller or a guide pin, and a guiding guide element, in particular a guide rail or a groove or a slotted link. The guide unit ensures the correct sequence of motion during an actuation process of the switch arrangement. Due to the multiple degrees of freedom of movement, which are enabled by the articulation, it is advantageous when each switch segment is individually guided. The guide unit is preferably arranged between the base surface and the switch segment, wherein the guide member is at least indirectly connected to the switch segment and the guide element is at least indirectly connected to the base surface.

It is particularly preferred when the guide member is designed as a guide roller and the guide element is designed as a guide rail, wherein the guide roller rests, for example, laterally against the guide rail.

The aforementioned sliding surface, for example, on which the support point, in particular the slide bearing, is movably mounted, is located on a top side of the guide element.

The support point and the guide member can be designed as a structural unit, as described above.

It is also advantageous when the guide unit has at least one redundant guide means for at least one guide member. As in the case of the redundant support, the redundant guide means can prevent an uncontrolled movement of the switch arrangement in the event of failure of the guide member. For this purpose, the redundant guide means must merely be designed essentially having the same shape as the guide member in order to be able to interact with the guide element. In this case as well, it can be advantageous when the redundant guide means are arranged such that the redundant guide means do not touch the guide element during normal operation.

The redundant guide means can also prevent the switch arrangement from being moved past an intended range, for example, in the event of a malfunction. The redundant guide means can therefore define an end position of the switch arrangement.

It is also advantageous when the guide unit includes at least one spring, which is designed for pressing the guide member against the guide element. It is advantageous primarily during the passage of a vehicle and with respect to the associated loads when the contact between the guide member and the guide element is not interrupted. The spring can contribute thereto, on the one hand, but, in particular, so can the above-described spring element. A certain redundancy established as a result can contribute to the safety of the switch arrangement.

It is particularly advantageous when the guide element is straight or curved, wherein the curvature preferably describes at least one circular arc. The guide element mainly guides the movement of the switch segments and, thereby, of the switch arrangement. Depending on the desired sequence of motion, the guide element must be shaped differently, if necessary.

In particular, the curvature of the guide element describes multiple circular arcs having different radii.

Moreover, it is advantageous when the guide element extends in parallel to the base surface. The switch segments are therefore also guided in parallel to the base surface when they move.

In particular, the guide element is arranged, in the form of a guide rail, on the base surface. It is also conceivable that the guide element extends in the base surface.

It is advantageous when the elements of the guide unit are exchangeable and/or adjustable. Since wear of the guide unit necessarily arises in the case of a plurality of actuation processes of the switch arrangement, a readjustment or exchange of elements of the guide unit is advantageous for a low-interference operation of the switch arrangement. Elements of the guide unit refer primarily to the guide member and its wearing parts.

It is also advantageous when the base surface is formed by at least one concrete slab, in particular a precast concrete slab. The switch arrangement is stable and cost-effective as a result. Height differences can be avoided and, primarily in the case of a precast concrete slab, the switch arrangement can be built in a short time. It is conceivable, in particular, to provide multiple concrete slabs of different shapes. It is also possible to arrange multiple small concrete slabs on one large concrete slab.

It is also advantageous when the base surface has multiple pedestals for accommodating the guide elements. The pedestals can be utilized for compensating for height differences and possible irregularities arising from the casting of the concrete slabs. The pedestals can also contribute to creating an open space between the base surface and the switch segments, for example, for accommodating the drive, the locking mechanism, and/or other infrastructure units.

The pedestals can already be provided, for example, when the base surface is cast and, in particular, can be sanded down after the casting in order to ensure a uniform height. The pedestals can have receiving means, such as, in particular, boreholes, preferably with additional screw anchors for mounting the guide elements. Clamps are also conceivable as receiving means, in particular of the same type that is used for mounting rails on track sleepers.

One pedestal can be provided for each guide element. It is also conceivable, however, that multiple guide elements are arranged on the same pedestal, or multiple pedestals are provided for one guide element. In the latter variant, it is possible, for example, to provide T-shaped pedestals on end faces of the guide elements in order to carry away lateral forces.

When the base surface is formed from a large concrete slab and multiple small concrete slabs arranged thereon, the pedestals are preferably arranged on the smaller concrete slabs. In particular, the pedestals are already provided when the smaller slabs are cast.

It is also advantageous when the switch segments each have at least one rail section, wherein the rail section is arranged in a tapered manner at the rail section of a subsequent switch segment. Due to the tapering, only comparatively small gaps form between the rail sections when the switch segments move against each other. In particular, the rail section forms a set-down rail on which the vehicle comes to rest in the event of an emergency, in particular in the event of a failure of the levitation system. The rail section can also be a current rail or a reaction rail for the levitation system of the vehicle.

It is advantageous when the rail section is chamfered, in particular rounded, at each of its ends. As a result, abutting edges between the rail sections can be avoided. If the vehicle slides on the rail sections in the event of an emergency, the antifriction material of the runners is conserved.

Advantageously, at least one switch segment has a locking mechanism, with the aid of which a switch arm can be locked on a fixed guideway or another switch arm. The locking mechanism can have, for example, a bolt, which can be extended, in particular, by means of a motor. Preferably, the bolt is designed for penetrating a sleeve of a diametrically opposed switch segment of another switch arm or of a fixed guideway section. The bolt and, if necessary, the motor can also be arranged on the fixed guideway section and the switch segment can have the sleeve. Alternatively or additionally, it is conceivable to provide a self-locking drive for the switch arrangement, which also deploys a locking effect. For the release for traveling on the switch arrangement, the correct locking can be established, for example, by means of a proximity sensor, which detects the correct position of the bolt.

Preferably, the motor of the locking mechanism can be manually actuated in the event of an emergency, for example, by means of a crank and appropriate maintenance personnel.

BRIEF DESCRIPTION OF THE DRAWINGS OF EXEMPLARY EMBODIMENTS

Figure 2A:
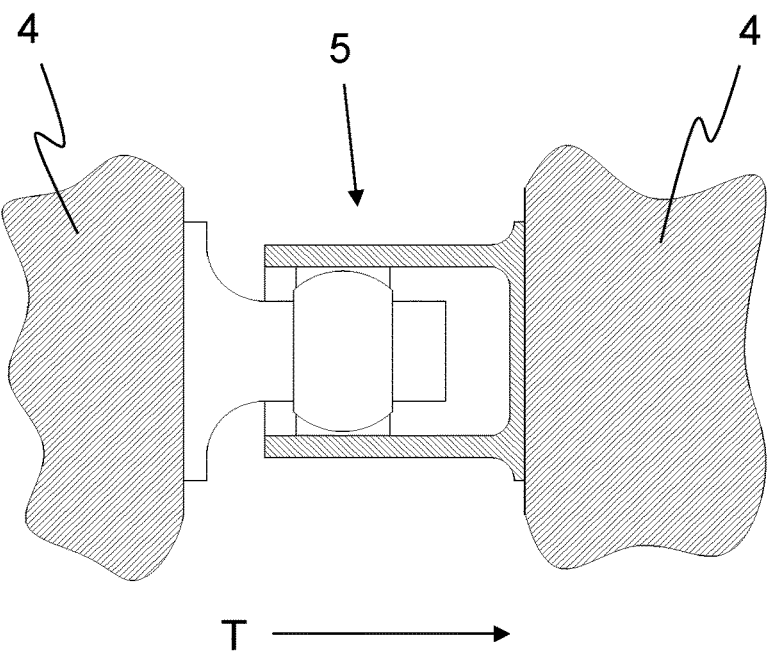
Figure 2B:
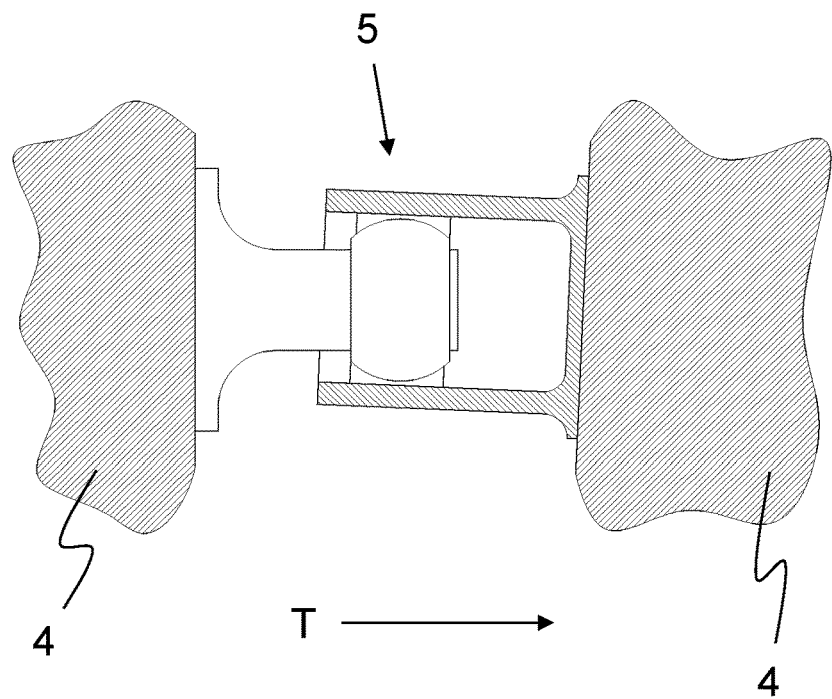
Figure 3:
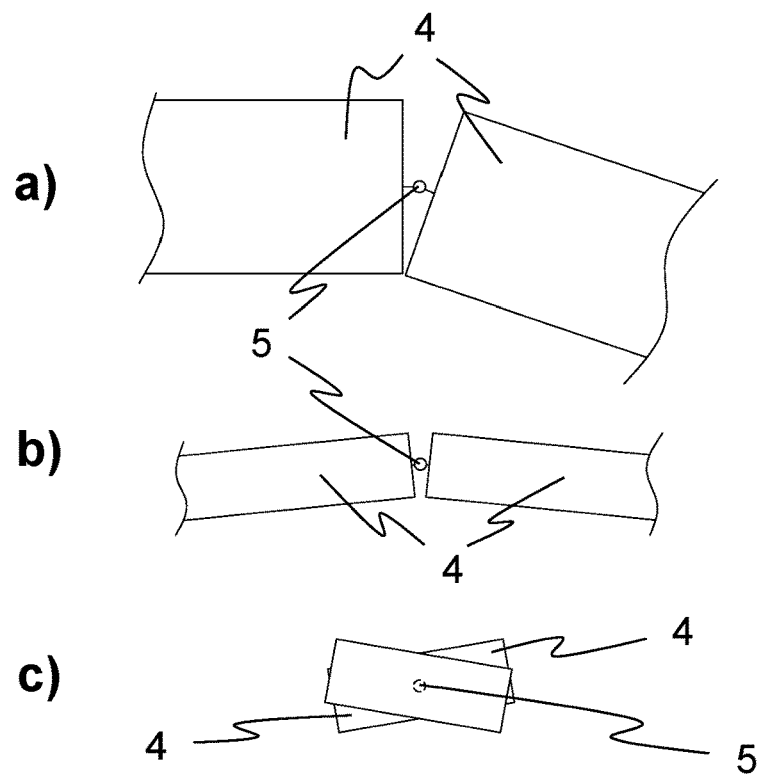
Figure 4:
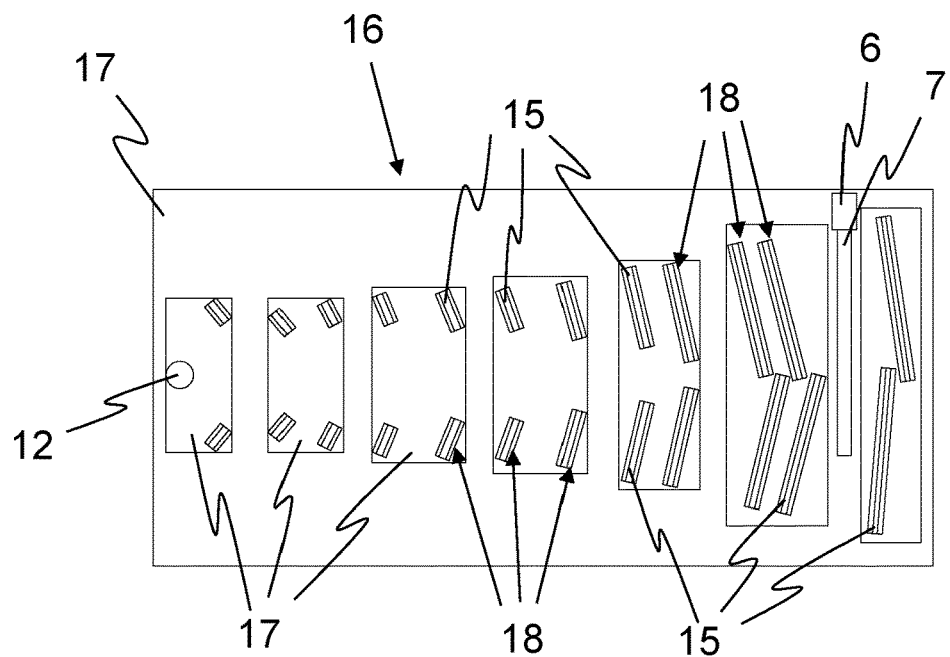
Figure 5:
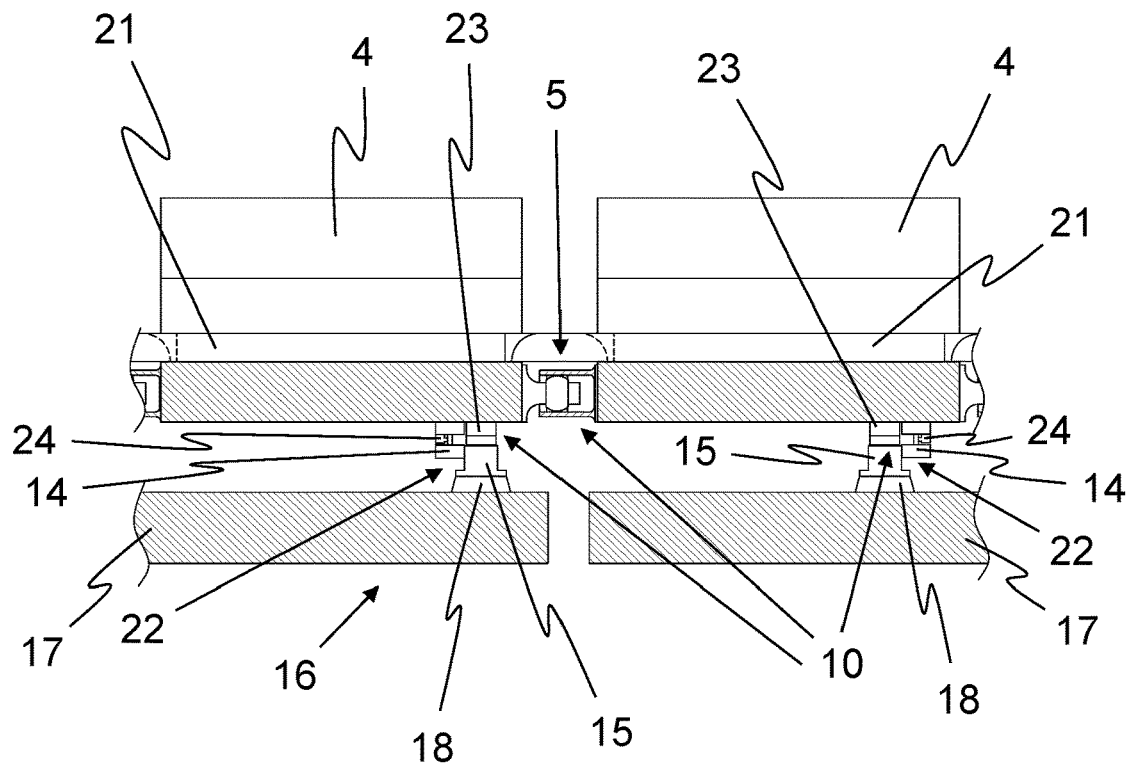
Figure 6:
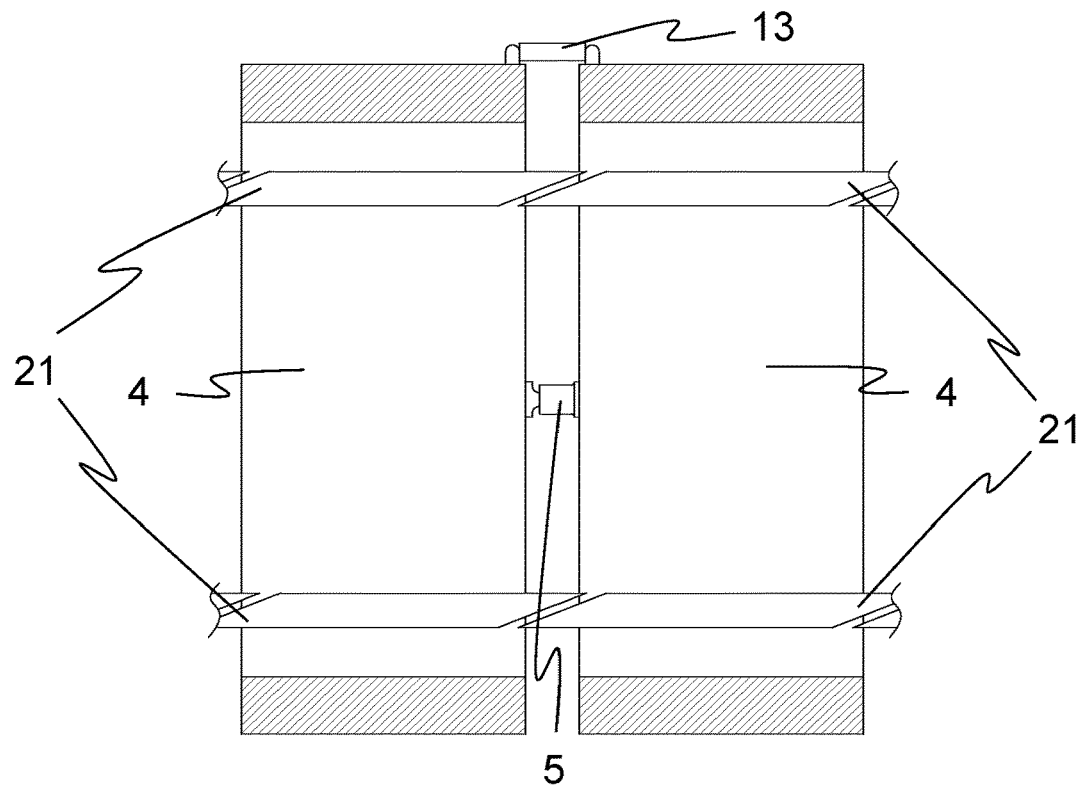
Figure 7:
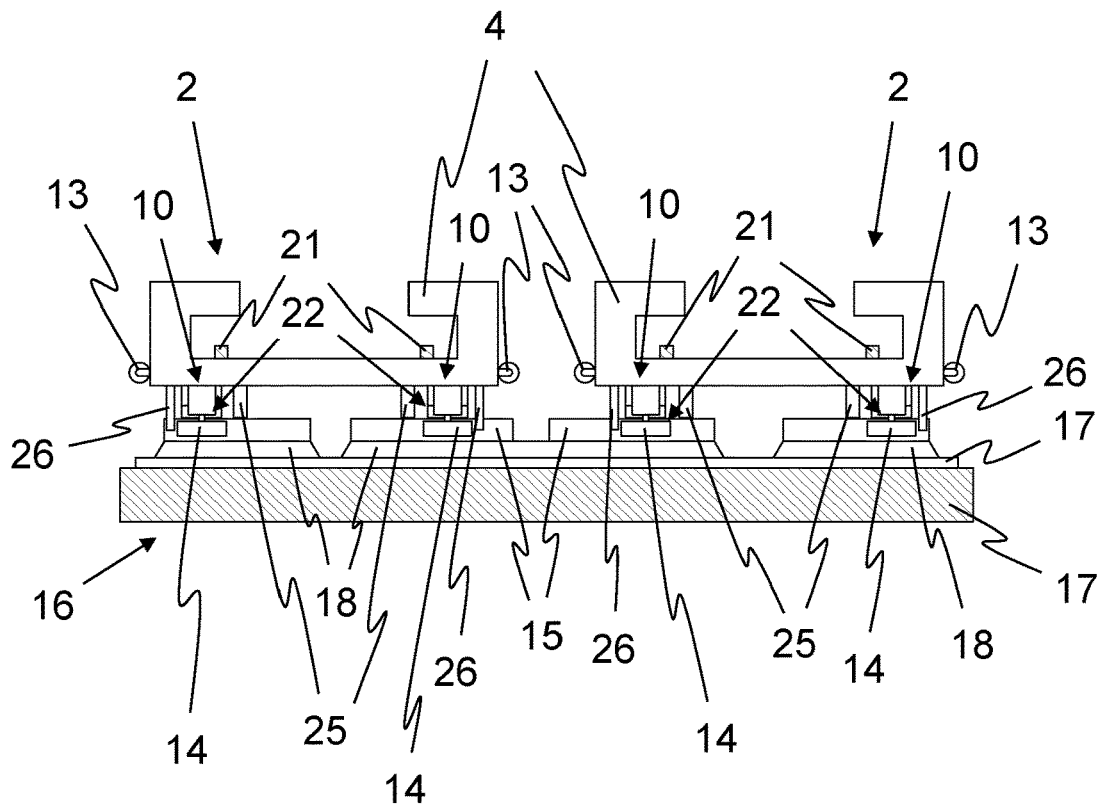

Further advantages of the invention are described in the following exemplary embodiments, wherein:

FIG. 1 shows a top view of a switch arrangement according to the invention,

FIG. 2a shows a section through an articulation between two switch segments in a relatively compressed mode of operation, FIG. 2b shows a section through the articulation between two switch segments in a relatively extended mode of operation, FIG. 3a, b, c shows a representation of three respective possible degrees of rotational freedom of the articulation, FIG. 4 shows a top view of a base surface of the switch arrangement, FIG. 5 shows a section in a vertical plane through two switch segments in a side view, FIG. 6 shows a section through two switch segments in a top view, FIG. 7 shows a front view of two switch arms of a further embodiment of the switch arrangement, and FIG. 8a shows a schematic representation of one embodiment of the switch arrangement as an X-switch, FIG. 8b shows a schematic representation of another embodiment of the switch arrangement as an X-switch.

DETAILED DESCRIPTION OF EXEMPLARY EMBODIMENTS OF THE INVENTION

In the following description of the figures, the same reference signs are utilized for features that are identical and/or at least comparable in each of the various figures. The individual features, their embodiment and/or mode of operation are explained in detail usually only upon the first mention thereof. If individual features are not explained in detail once more, their embodiment and/or mode of operation correspond/corresponds to the embodiment and mode of operation of the features that act in the same way or have the same name and have already been described.

FIG. 1 shows a view from an overhead perspective of a switch arrangement 1 according to the invention as a Y-switch with a movable switch arm 2. A vehicle (not represented) can be guided from a single fixed guideway 3 selectively onto one of two further fixed guideways 3, which are disposed so as to fork away from the single fixed roadway 3. The switch arrangement 1 has multiple switch segments 4, which are interconnected via articulations 5. A respective articulation 5 is disposed between each pair of adjacent switch segments 4. For example, as schematically shown in FIGS. 2a and 2b, the articulations 5 are arranged in the center on end faces of the switch segments 4. The articulations 5 have multiple degrees of rotational freedom (see FIGS. 3a, b and c) and, in particular, one degree of translational freedom T (see FIGS. 2a and b). The switch arrangement 1 is therefore highly flexible: Gaps between the switch segments 4, which are represented enlarged in the present case for the sake of clarity, can be kept small, and the switch arrangement 1 can be configured to be space-saving.

The degree of translational freedom T schematically shown in FIGS. 2a and 2b enables the switch arm 2 to extend or compress. In the present case, the switch arm 2 can be compressed, for example, during an actuation process, in the area between the two subsequent guideways 3, and so these can be arranged closer to the switch arrangement 1 without the risk of a collision.

To effectuate the actuation process, the switch arrangement 1 has a drive 6, which is connected to one of the switch segments 4 by means of a force transmission device 7 as schematically shown in FIG. 1. In the present example, the drive 6 is connected to an end segment 8 of the switch arrangement 1. The end segment 8 is designed, for example, to be longer in the direction of travel than the remaining switch segments 4, since there may be higher requirements on stability here. For the same reasons, the end segment 8 in this exemplary embodiment is connected to the preceding switch segment 4 via an articulated rod 9. The end segment 8 is also mounted, in particular, on four support points 10 (FIG. 5), whereas the remaining switch segments 4 are each mounted on three support points 10.

With respect to the mounting, particularities can also exist for an initial segment 11 shown schematically in FIG. 1. The initial segment 11 is mounted, for example, on a pivot bearing 12 in addition to possible further support points 10. The switch arrangement 1 is therefore mechanically decoupled from the fixed entry-side guideway 3.

The switch segments 4 are also interconnected via spring elements 13 shown schematically in FIGS. 1, 6 and 7. On the other hand, the spring elements 13 can also apply a pressure or a tension onto the switch segments 4 such that guide members 14 (FIG. 5) are pressed against guide elements 15.

The switch segments 4 are mounted so as to be movable with respect to a base surface 16 shown schematically in FIGS. 1, 4, 5 and 7. In this example, the base surface 16 is a surface formed by multiple concrete slabs 17. The concrete slabs 17 are designed, in particular, as precast concrete slabs and have, for example, different dimensions. Pedestals 18, on which the guide elements 15 are arranged, are arranged on the base surface 16 and on the concrete slabs 17 as shown for example in FIGS. 1, 4, 5 and 7. The pedestals 18 are preferably also made of concrete and, in particular, are integral parts of the concrete slabs 17. Sliding surfaces 19, as schematically shown in FIG. 1 for example, on which the support points 10 of the switch segments 4 slide, are located on top sides of the guide elements 15.

The movement of the switch arm 2 or of the switch arrangement 1 is essentially controlled by the guide elements 15. In this example as shown in FIG. 1, the guide elements 15 are designed to be straight. The guide elements 15 can also be curved, however. The guide elements 15 are designed, for example, as rails and, in particular, as steel rails. At least two guide elements 15, for example, are arranged on each concrete slab 17.

For the purpose of protection, in particular during a passage of a vehicle, the switch arm 2 or the switch arrangement 1 can be locked, for example, by means of a locking mechanism 20 as shown schematically in FIG. 1. The switch arm 2 and, in particular, the end segment 8 is fixedly connected in this case to one of the two subsequent guideways 3, for example, by means of a bolt.

FIG. 2 shows an exemplary embodiment of the articulation 5 for the switch arrangement 1 according to the invention. A section through the articulation 5 and parts of the connected switch segments 4 is represented. The articulation 5 is designed as an adjustable ball joint having three independent degrees of rotational freedom (see FIG. 3) and one degree of translational freedom T. First and foremost, the degree of translational freedom T of the articulation 5 is to be illustrated in this representation. An extension (FIG. 2b) and/or a compression (FIG. 2a) of the switch arms 2 of the switch arrangement 1 are/is enabled as a result.

In FIG. 2a, the switch arm 2 including the articulation 5 is straight, as would be the case schematically for example in FIG. 8a. FIG. 2b shows, for example, the situation of an angled switch arm 2, wherein the switch arm 2 is additionally extended as would be the case schematically shown for example in FIG. 1 and FIG. 8b.

FIG. 3 diagrammatically shows the possible independent degrees of rotational freedom of an articulation 5 for the switch arrangement 1 according to the invention. In each of the three views shown, the rotation axis of the articulation 5 is perpendicular to the plane of the drawing. FIG. 3a is a diagrammatic top view similar to FIG. 1. The plane of the drawing here is the aforementioned guideway plane. The rotation axis extends perpendicularly to the guideway plane and is essentially parallel to a vertical axis coincident with the direction of the attractive force of gravity. FIG. 3b is a diagrammatic side view similar to FIG. 5. The guideway plane here extends perpendicularly to the plane of the drawing. The rotation axis in this case is parallel to the guideway plane but extends perpendicularly to the direction of travel of a vehicle passing through the switch arrangement 1 and perpendicularly to the vertical axis. FIG. 3c is a diagrammatic front view similar to FIG. 7. In this case as well, the guideway plane extends perpendicularly to the plane of the drawing. The rotation axis is also parallel to the guideway plane. In contrast to the preceding case, however, the rotation axis is also parallel to the direction of travel of a vehicle passing through the switch arrangement 1. The offset between the switch segments 4 is highly exaggerated in all cases represented in these figures for the sake of clarity. In the switch arrangement 1 according to the invention, the articulation 5 has, in particular, at least two of these degrees of rotational freedom or at least one of the shown degrees of rotational freedom and at least one degree of translational freedom T.

FIG. 4 shows, similarly to FIG. 1, in a top view, the substructure of the switch arrangement 1, although without the switch segments 4 for the sake of clarity. In this embodiment, the base surface 16 is formed by one large concrete slab 17 on which rest multiple smaller concrete slabs 17. The concrete slab 17 on which the initial segment 11 rests has the above-described pivot bearing 12. The pedestals 18 and the guide elements 15 have different lengths and arrangements depending on the freedom of movement of the particular switch segments 4 that is necessary for an actuation process of the switch arrangement 1. In particular, the length of the guide elements 15 and, possibly, the pedestals 18 increases from the initial segment 11 in the direction of the end segment 8.

FIG. 5 shows a cut side view of two consecutive switch segments 4 of the switch arrangement 1. The switch segments 4 each have a rail section 21. The rail sections 21 are chamfered and, in particular, rounded (cf. also FIG. 6), for example, in the immediate vicinity of the articulation 5. The rail sections 21 can be, for example, part of a set-down rail, on which the vehicle comes to rest in the event of an emergency. The switch segments 4 are each mounted on support points 10, wherein, for example, two of the support points 10 are arranged underneath the switch segments 4 in each case and one additional support point 10 is formed by the articulation 5 between two adjacent switch segments 4 as schematically shown in FIG. 5 for example.

Two guide units 22 are assigned to each switch segment 4 as schematically shown in FIG. 7 for example. Each guide unit 22 is situated partially ahead of the plane of the drawing schematically shown in FIG. 5. Each of the guide units 22 includes the guide member 14 and the guide element 15. In the present case, the support points 10 arranged underneath the switch segments 4 have slide bearings 23, which are mounted in a sliding manner on a top side of the guide elements 15 as schematically shown in FIG. 5 for example. The guide elements 15, which are designed, for example, as guide rails, are arranged on pedestals 18 as before. The base surface 16 is formed by two concrete slabs 17 as schematically shown in FIG. 5 for example.

The guide members 14, which are designed as guide rollers in this example schematically shown in FIG. 5, rest laterally against the guide elements 15. The guide members 14 are connected to the particular switch segment 4. For example, an uninterrupted contact between the guide members 14 and the guide elements 15 is ensured by a spring 24, which presses the guide members 14 against the guide elements 15. For example, the guide members 14 of two consecutive switch segments 4 can be arranged on different sides of the guide elements 15. The guide members 14 can be either facing each other or facing away from each other (as represented in the present case schematically shown in FIG. 5).

FIG. 6 shows a cut through a horizontal plane of a top view, for example, of the switch segments 4 from FIG. 5. The switch segments 4 have rail sections 21 as before. In particular, each switch segment 4 has two rail sections 21. One of the rail sections 21 of one of the switch segments 4 in each case is arranged in a tapered manner at one of the rail sections 21 of the subsequent switch segment 4. As a result, the gaps between the consecutive rail sections 21 are kept small also in the case of a curved switch arm 2 of the switch arrangement 1.

Figure 8:
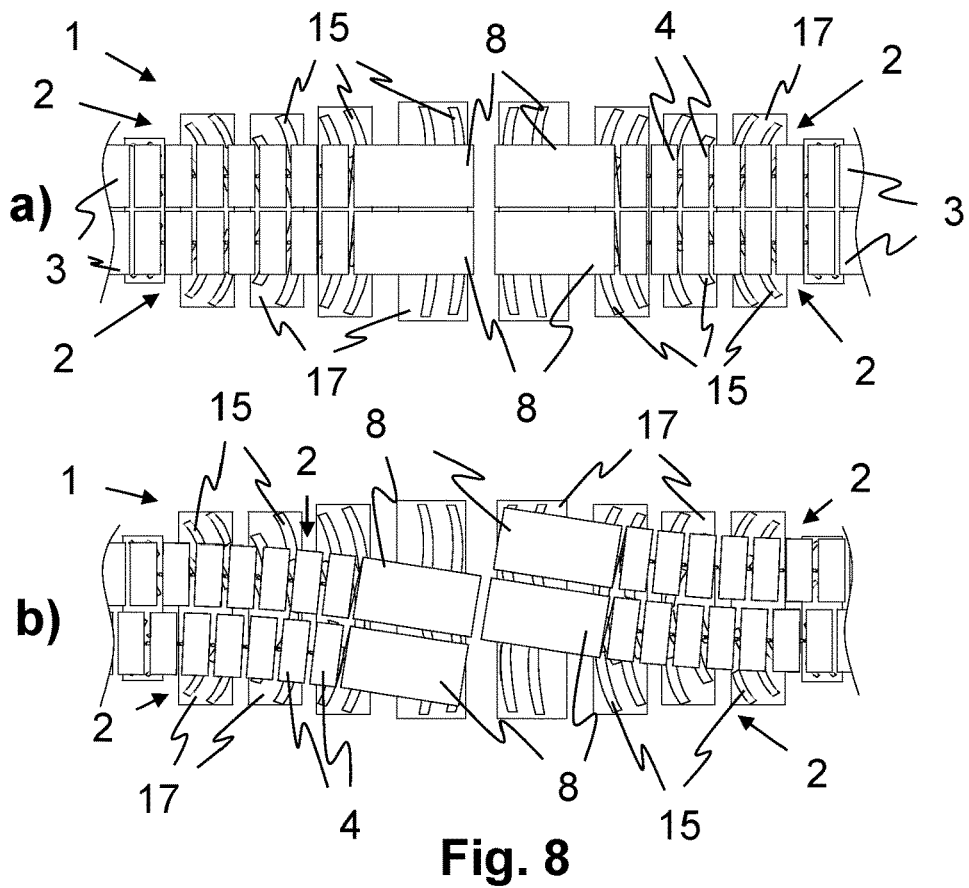

FIG. 7 shows a front view of a switch arrangement 1, which includes multiple movable switch arms 2 such as schematically depicted in FIG. 8. In this representation, the essentially U-shaped switch segments 4 are to be recognized having overhanging sections. The base surface 16 is the upper surface formed from one large common concrete slab 17, which is shared in common by the side-by-side switch segments, and at least one smaller concrete slab 17 for each switch segment 4. The pedestals 18 for the guide elements 15 are arranged thereon. For example, two guide elements 15 are arranged on one common pedestal 18.

In this exemplary embodiment, each of the support points 10 has a redundant support 25. These redundant supports 25 are configured so that they can catch the switch segments 4 in the event of failure of the support points 10 and, thereby, avoid a serious accident. Each of the guide units 22 also has a redundant guide means 26 for each guide member 14. In the event of an emergency, the redundant guide means 26 can engage and prevent uncontrolled movements of the switch segments 4.

FIG. 8 diagrammatically shows the switch arrangement 1 according to the invention as an X-switch. Vehicles can be guided from two fixed guideways 3 schematically shown in FIG. 8a selectively to two further guideways 3 schematically shown in FIG. 8b. For this purpose, the switch arrangement 1 has a total of four movable switch arms 2. FIG. 8a shows the switch arrangement 1 in the normal position. Vehicles can pass through the switch arrangement in a straight line in this position. FIG. 8b shows, by way of example, a position of the switch arrangement 1, in which a vehicle can be guided from the left upper guideway 3 to the right lower guideway 3. For this purpose, for example, all switch arms 2 must be brought into a curved position. The switch arms 2 facing each other can be extended here, for example, by the degree of translational freedom T of the articulations 5. The switch arms 2 facing away from each other can be, for example, compressed in the sense of a space-saving configuration of the switch arrangement.

In particular, the guide elements 15 are curved in this embodiment of the switch arrangement 1 schematically shown in FIGS. 8a and 8b. The end segments 8 of the switch arms 2 can have locking mechanisms 20, each of which locks two mutually facing end segments 8 with respect to one another. A drive 6 is preferably assigned to each switch arm 2.

The present invention is not limited to the exemplary embodiment that has been represented and described. Modifications within the scope of the claims are also possible, as is any combination of the features, even if they are represented and described in different exemplary embodiments.

LIST OF REFERENCE CHARACTERS 1 switch arrangement
2 switch arm
3 guideway
4 switch segment
5 articulation
6 drive
7 force transmission device
8 end segment
9 articulation rod
10 support point
11 initial segment
12 pivot bearing
13 spring element
14 guide member
15 guide element
16 base surface
17 concrete slab
18 pedestal
19 sliding surface
20 locking mechanism
21 rail section
22 guide unit
23 sliding bearing
24 spring
25 redundant support
26 redundant guide means
T degree of translational freedom

The invention claimed is:

1. A switch arrangement for a vehicle movable along a track that is anchored to a base surface, the switch arrangement comprising:
a first switch segment that includes a drive;
a second switch segment disposed spaced apart from the first switch segment so that both switch segments are movable along the track with respect to the base surface; and
an articulation, which connects the first switch segment to the second switch segment and has a first degree of rotational freedom about a first rotational axis, wherein the articulation has a second degree of rotational freedom about a second rotational axis that is non-parallel to the first rotational axis;
wherein the articulation has one degree of translational freedom that includes one additional degree of rotational freedom about the first rotational axis.

2. The switch arrangement of claim 1, wherein the articulation is designed as a ball-and-socket joint or an adjustable ball joint.

3. The switch arrangement of claim 1, wherein the first switch segment is mounted on a pivot bearing.

4. The switch arrangement of claim 1, wherein the articulation includes an articulated rod.

5. The switch arrangement of claim 1, further comprising a spring element that connects the two switch segments.

6. The switch arrangement of claim 1, wherein each switch segment is mounted on at least three support points.

7. The switch arrangement of claim 6, wherein one of the at least three support points is formed by the articulation connecting the two switch segments.

8. The switch arrangement of claim 6, wherein each of the at least three support points is configured to be displaceable essentially in parallel with respect to the base surface.

9. The switch arrangement of claim 6, wherein one of the at least three support points has a degree of rotational freedom about the first rotational axis.

10. The switch arrangement of claim 6, wherein one of the at least three support points has a roller, one slide bearing, or one fluid bearing.

11. The switch arrangement of claim 6, wherein one support point includes a redundant support.

12. The switch arrangement of claim 1, further comprising a first guide unit assigned to the first switch segment, a second guide unit assigned to the second switch segment, wherein each of the first and second guide units includes guided guide member that is configured as a guide roller or a guide pin, and wherein each of the first and second guide units includes a guiding guide element that is configured as a guide rail or a groove or a slotted link.

13. The switch arrangement of claim 12, wherein the first guide unit includes a redundant guide means for the guide member.

14. The switch arrangement of claim 12, wherein the first guide unit includes a spring, which is designed for pressing the guide member against the guide element.

15. The switch arrangement of claim 12, wherein the guide element is straight or curved to define a circular arc.

16. The switch arrangement of claim 12, wherein the first guide unit includes a plurality of elements, which are exchangeable and/or adjustable.

17. The switch arrangement of claim 1, further comprising a precast concrete slab that includes the base surface.

18. The switch arrangement of claim 1, wherein the first switch segment has a first rail section and the second switch segment has a second rail section, wherein the first rail section is arranged in a tapering manner at the second rail section, and wherein the first rail section is tapered and rounded at both opposite ends of the first rail section.

19. The switch arrangement of claim 1, wherein the first switch segment has a locking mechanism.

\* \* \* \* \*